United States Patent [19]

Fujimoto et al.

[11] Patent Number: 5,140,960
[45] Date of Patent: Aug. 25, 1992

[54] APPARATUS FOR CONTROLLING IDLING REVOLVING RATE OF ENGINE

[75] Inventors: Takanori Fujimoto; Hiroyasu Kisaichi, both of Himeji, Japan

[73] Assignee: Mitsubishi Denki K. K., Tokyo, Japan

[21] Appl. No.: 490,205

[22] Filed: Mar. 8, 1990

[30] Foreign Application Priority Data

Mar. 8, 1989 [JP] Japan .................................. 1-56612
Mar. 8, 1989 [JP] Japan .................................. 1-56613

[51] Int. Cl.⁵ .............................................. F02M 3/00
[52] U.S. Cl. ................................. 123/339; 290/40 C
[58] Field of Search ...................... 123/339, 349, 350; 290/40 C, 40 F, 51

[56] References Cited

U.S. PATENT DOCUMENTS

| 4,875,447 | 10/1989 | Kiuchi et al. | 123/339 |
| 4,877,273 | 10/1989 | Wazaki et al. | 390/40 C |
| 4,879,982 | 11/1989 | Itakura et al. | 123/339 |
| 4,898,005 | 2/1990 | Sakurai | 123/339 |
| 4,903,658 | 2/1990 | Miyama et al. | 123/339 |
| 4,903,659 | 2/1990 | Inagaki et al. | 123/339 |

Primary Examiner—Raymond A. Nelli
Attorney, Agent, or Firm—Sughrue, Mion, Zinn, Macpeak & Seas

[57] ABSTRACT

An apparatus for controlling an engine idling rate comprises first correction means for correcting the engine idling rate according to the excitation period in each predetermined cranking period for driving a generator of the engine. A second correction means corrects the predetermined cranking period according to the engine idling rate, and suppresses variations of the engine idling rate.

5 Claims, 8 Drawing Sheets

FIG. 1

CRANKING ANGLE SIGNAL

FIG. 2

EXCITATION SIGNAL

CRANKING ANGLE SIGNAL

D-I_E TABLE

FIG. 15

I_E - P_E TABLE

FIG. 16

W_T - K_ET TABLE

APPARATUS FOR CONTROLLING IDLING REVOLVING RATE OF ENGINE

BACKGROUND OF THE INVENTION

This invention relates to an apparatus for controlling the idling rate (engine rotation speed) of an engine and, more particularly to an apparatus, which can prevent variations of the idling rate of the engine when driving a generator for charging a battery with the engine.

In a prior art engine idling control apparatus, the idling rate of the engine is held at a desired idling rate through control of the supply rate of intake air to the engine according to the difference between the desired idling rate and the actual idling rate of the engine.

In using the prior art apparatus noted above in cases where an electric load (such as a headlight and a motor-driven radiator and fan) is greatly consuming electric power, the operation of the generator which supplies power to the electric load increases the engine load to reduce the rotation speed or idling rate of the engine. When the idling rate of the engine is reduced, the desired idling rate is eventually produced by the above control operation. However, depending on the magnitude of the electric load, an engine stall is liable to result because of slow control response.

Accordingly, it has been proposed to correct the rate of in-take air supply by detecting a plurality of electric load switches as disclosed, for instance, in Japanese Patent Disclosure 58-197449. In this case, however, switches and input circuits corresponding in number to the number of electric loads are necessary, thus increasing the scale and complicating the construction of the control apparatus.

SUMMARY OF THE INVENTION

This invention has been designed to solve the above problem, and its object is to provide an engine idling control apparatus, which is simple in construction and which can eliminate engine stall or delay of control response.

According to the invention, there is provided an excitation period detection mans for detecting the excitation period for each predetermined crank angle of each cylinder (predetermined cranking period) of the engine, first correcting means for correcting the engine idling rate according to the excitation period and second correcting means for correcting the predetermined cranking period noted above according to the engine idling rate.

The above and other objects, features and advantages of the invention will become apparent from the following description when taken in conjunction with the accompanying drawings.

DESCRIPTION OF THE PREFERRED EMBODIMENT

Figure 1:
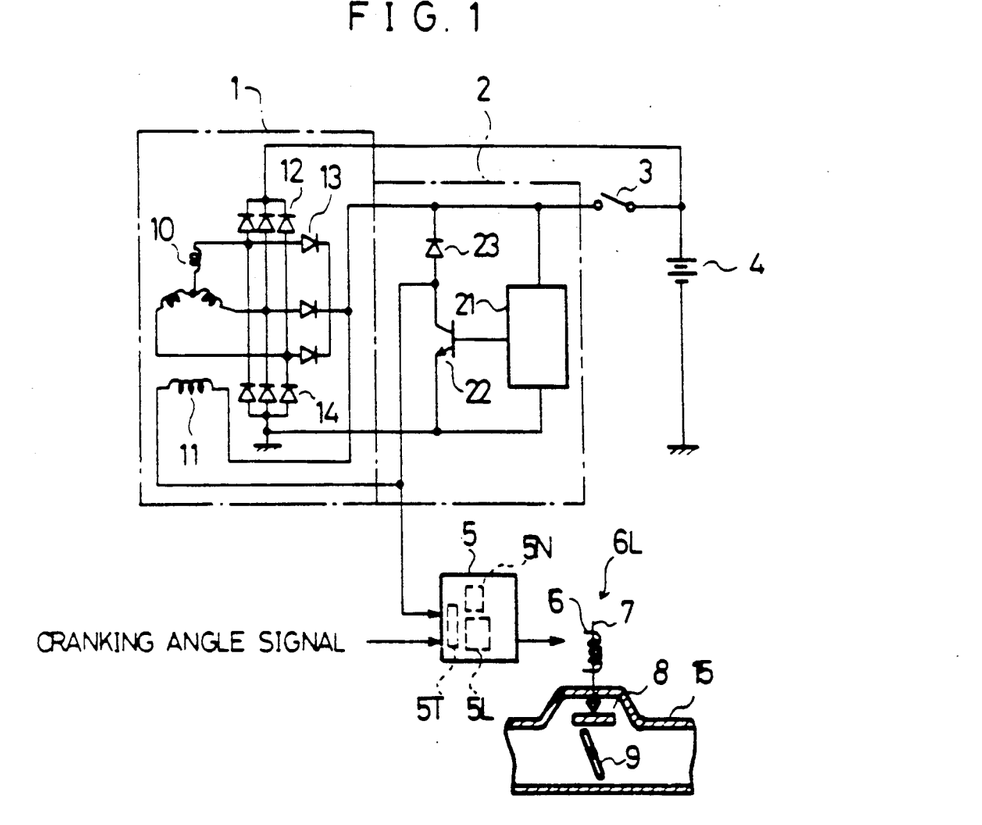
FIGS. 1 and 2 are schematics showing an embodiment of the apparatus according to the invention and a control unit.

An embodiment of the invention will be described with reference to the drawings. FIG. 1 shows the construction of the engine idling rate control apparatus as an embodiment of the invention. Reference numeral 1 designates a generator. 2 is a switching means for controlling exciting current in field coil 11, 3 is an engine switch; and 4 is a battery mounted in the vehicle. Generator 1 consists of Y-connected diodes 12 to 14 for rectifying three phase AC outputs of armature winding 10, field coil 11 and armature winding 10. Switching means 2 includes voltage detection circuit 21 for detecting the voltage of battery 4, semiconductor switching element 22 connected in series with field coil 11 and rendered conductive by the output of voltage detection circuit 21 when the voltage of battery 4 becomes lower than a predetermined value and a diode 23 for causing commutation of excitation current flowing through field coil 11 when semiconductor switching element 22 is rendered non-conductive. Reference numeral 5 designates a control unit, which receives an ON-OFF signal at a connection point between field coil 11 and semiconductor switching element 22 (hereinafter referred to as an "excitation signal") and a crank angle signal generated by a crank angle signal detection means (not shown) in synchronism with a predetermined engine crank angle to detect an excitation period of field coil 11 in a predetermined cranking period of the engine (i.e., "ON" period of semiconductor switching element 22). Control unit 5 calculates the amount of control according to the result of the detection. Control unit 5 includes excitation period detection means 5T and first and second correction means 5N and 5L. Reference numeral 6 designates a solenoid for ON-OFF controlling electromagnetic valve 7 according to a control amount output of control unit 5. Bypass passage 8 of throttle valve 9 provided in an in-take path 15 of the engine is opened and closed with the opening and closing of electromagnetic valve 7. Solenoid 6 constitutes engine idling rate control means 6L.

Hereinafter, the operation of excitation period detection means 5T and first correction means 5N will be described. Generator 1 is driven by the engine to charge battery 4. Switching means 2 controls excitation current through control of the excitation period of field coil 11 such that the voltage generated by generator 1 or voltage of battery 4 has a predetermined value.

Figure 2:
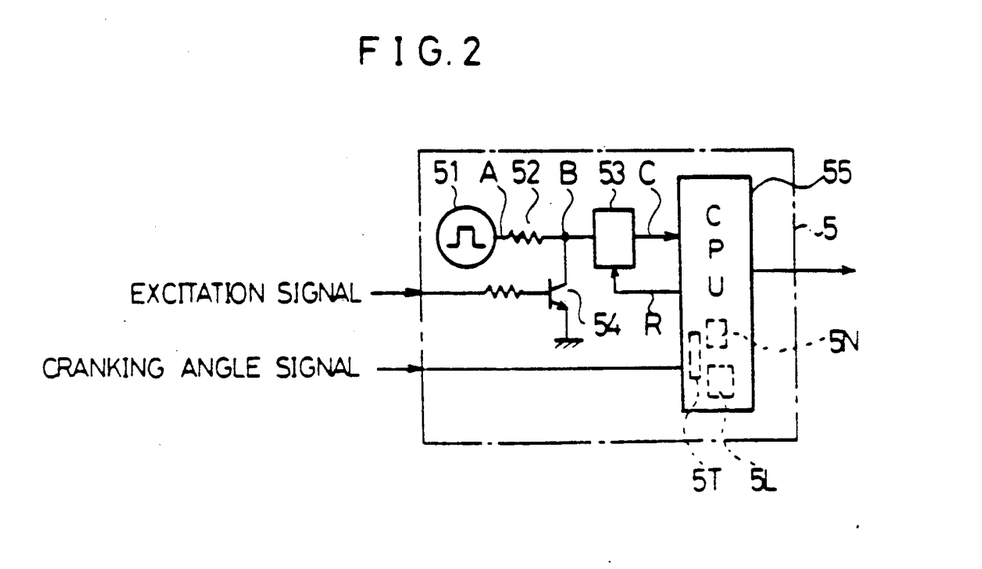
Figure 3:
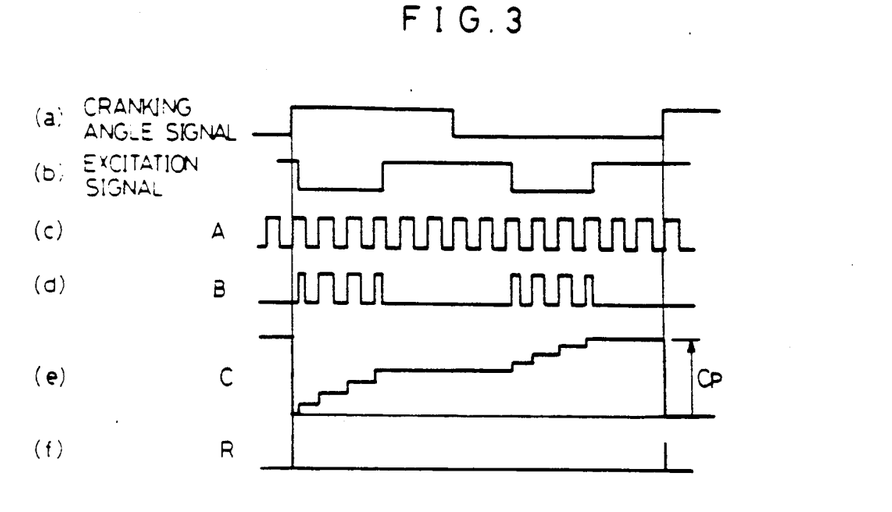
FIGS. 3 and 4 are timing charts for explaining the operation of the apparatus according to the invention.

The operation of detecting excitation period for every predetermined cranking period will be described with reference to FIGS. 2 and 3. FIG. 2 shows details of control unit 5, and FIG. 3 is a timing chart showing the operation. Reference numeral 51 designates a pulse generator for generating pulse signal A at a predetermined frequency (as shown in FIG. 3(c)). Pulse signal A is supplied through register 52 to counter 53. This input signal is masked by transistor 54 for a non-conduction period of the excitation signal shown in FIG. 3(b), and signal B and shown in FIG. 3(d) is supplied to counter 53. Counter 53 counts signal B supplies count data C shown in FIG. 3(e) to CPU 55. Every time the crank angle signal shown in FIG. 3(e) is generated (i.e., with every rising of signal in this embodiment) CPU 55 reads out count data C and provides an initialization signal R (as shown in FIG. 3(f)) to initialize counter 53. As a result, count data C becomes Cp as shown in FIG. 3(e). In the above operation, count Cp read out by CPU 55 corresponds to the excitation period for every predetermined cranking period.

Figure 4:
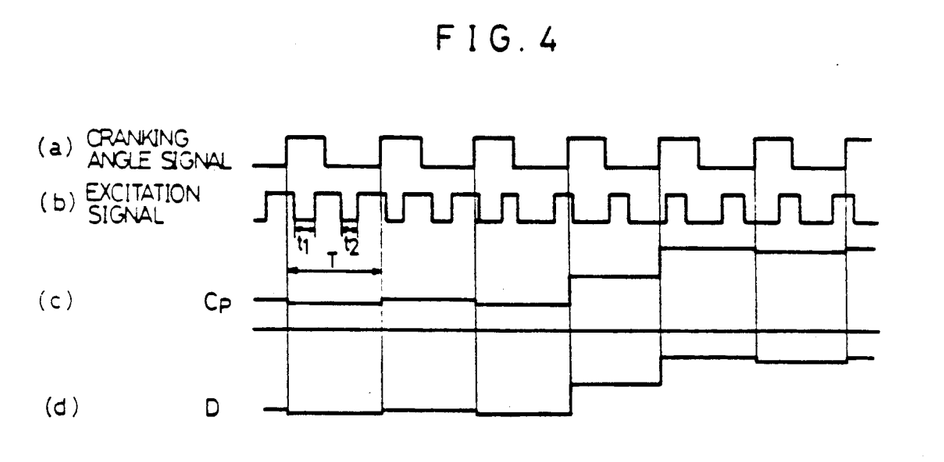
Figure 5:
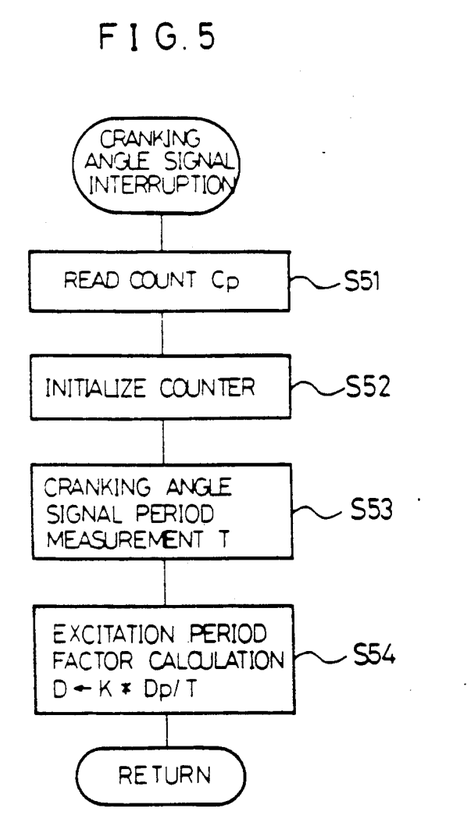
FIGS. 5 and 6 are flow charts for explaining the operation of the apparatus.
Figure 6:
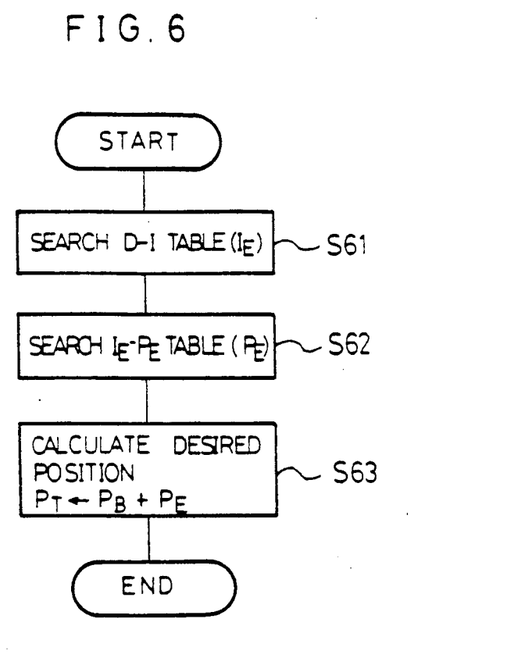

CPU 55 calculates a control amount, to which the supply rate of in-take air is controlled, from the cranking signal. This operation will be described with reference to FIGS. 4 to 6. FIG. 4 is a timing chart, and FIGS. 5 and 6 designate flow charts illustrating the procedure of calculating of the control amount. The routine shown in FIG. 6 is executed according to a control program. When a cranking angle signal is generated during execution of the routine, the routine is stopped, and a cranking angle signal interruption routine shown in FIG. 5 is executed. In step S51 as shown in FIG. 5, count Cp is read out, and in step S52 externally provided counter 53 is initialized. Count Cp read by CPU 55 is renewed for every cranking angle signal, and it is thus changed as shown in FIG. 4(c). In step S53, cranking angle signal period T is measured, and in step S54 excitation period factor D with respect to cranking angle signal period T is determined from an equation $$D = K_1 \times C_p / T$$

where K is a conversion factor for converting the excitation period factor D into predetermined resolution. More specifically, by denoting the excitation periods in cranking angle signal period T by t1 and t2, excitation period factor D is expressed as $$D \propto (t1 - t2)/T.$$

This value corresponds to the excitation current flowing through field coil 11, and it will be seen that a movement as shown in FIG. 4(d) is obtained. In the above way, the cranking angle signal interruption routine shown in FIG. 5 is completed.

Then, first correction means 5N determines a correction amount corresponding to the excitation period factor D in a routine shown in FIG. 6. First, in step S61 I is searched from the graph shown in FIG. 7 relating the excitation period factor D and I shown in FIG. 7. This value of I corresponds to the output current of generator 1. The relation D−I is changed with the engine idling rate Ne as a parameter because D corresponds to the excitation current in field coil 11 while I corresponds to the output current of generator 1. That is, the output of generator 1 is given by the magnitude of the excitation current and the idling rate of the engine.

Figure 7:
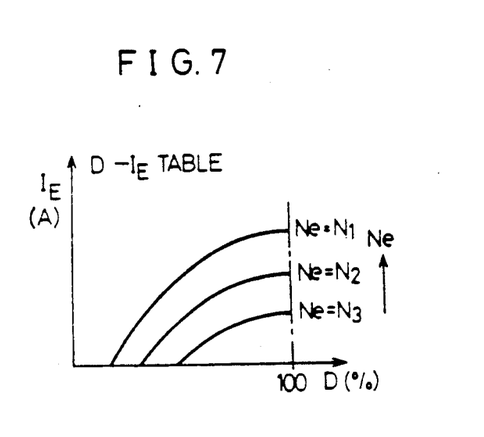
FIGS. 7 and 8 are graphs showing control characteristics stored in the control unit according to the invention.
Figure 8:
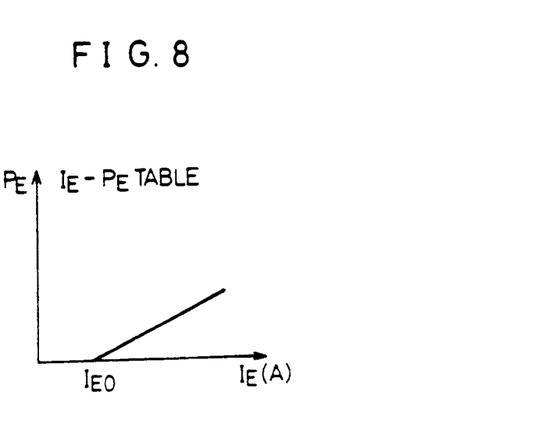

Thereafter, in step S62 the correction amount P corresponding to $I_E$ is searched from the relation between generator output current $I_E$ and correction amount $P_E$. Data set in FIG. 8 sets the correction amount corresponding to the electric load increase, with the point of generator output $I_{EO}$ in the absence of an electric load, being a zero correction amount. In step S63, the correction amount P obtained from FIG. 7 is added to the basic control amount P to control the final in-take air supply rate. In other words, the in-take air supply rate is increased for the engine idling rate control according to the correction extent P.

Figure 9:
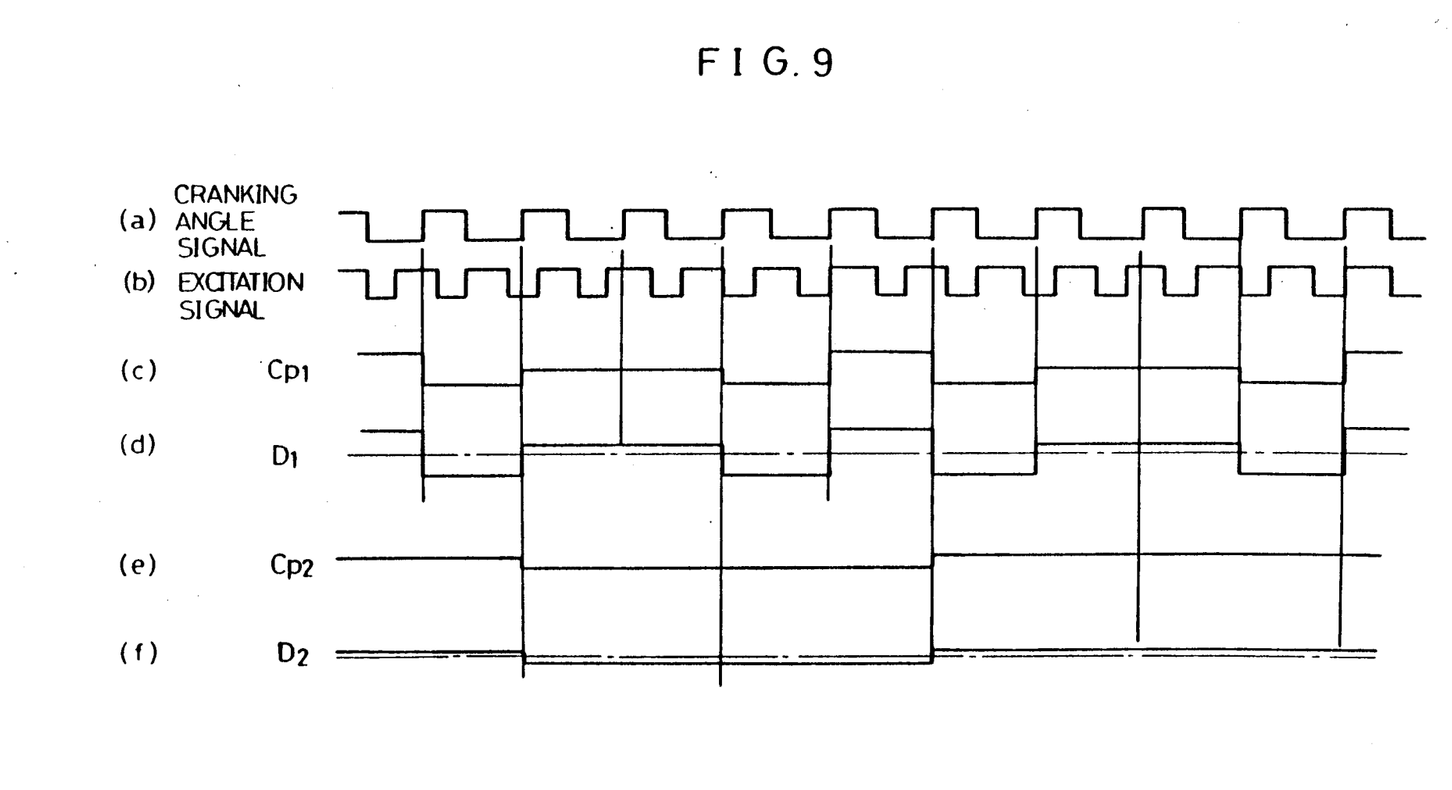
FIG. 9 is a timing chart illustrating a manner, in which the excitation period is varied at a high engine revolution speed.

The above description has been concerned with the detection of the excitation period for every predetermined period by excitation period detection means 5T and the operation of first correction means 5N. Now, a second correction means 5L will be described. It is found that when the excitation period detection period is detected up to a high idling rate in a fixed predetermined cranking period. (e.g. at a high idling rate, at which the detection period is short) the detected amount Cp in the excitation period is greatly varied. The variations are shown in FIG. 9, which shows count Cp and excitation period factor D with a constant excitation current and high engine idling rate. $Cp_1$ and $D_1$ are detected amounts when detection is performed for each cranking angle signal period, and $Cp_2$ and $D_2$ are detected amounts when detection is performed for every two cranking angle signals. Dash-and-bar plots in the Figure represent an average excitation period factor. As is obvious from the Figure, count C and excitation period factor D detected for every two cranking angle signal periods have less variations. However, if this cranking period is set to be unnecessarily long, the detection response is deteriorated, and particularly at a low engine idling rate a response delay to vary intake air supply rate with respect to electric load changes is produced. For this reason, in this embodiment with the second correction means 5L a predetermined cranking period is varied according to the engine idling rate, thereby obtaining a highly accurate detected amount and a satisfactory response characteristic for all engine idling rates.

Figure 10:
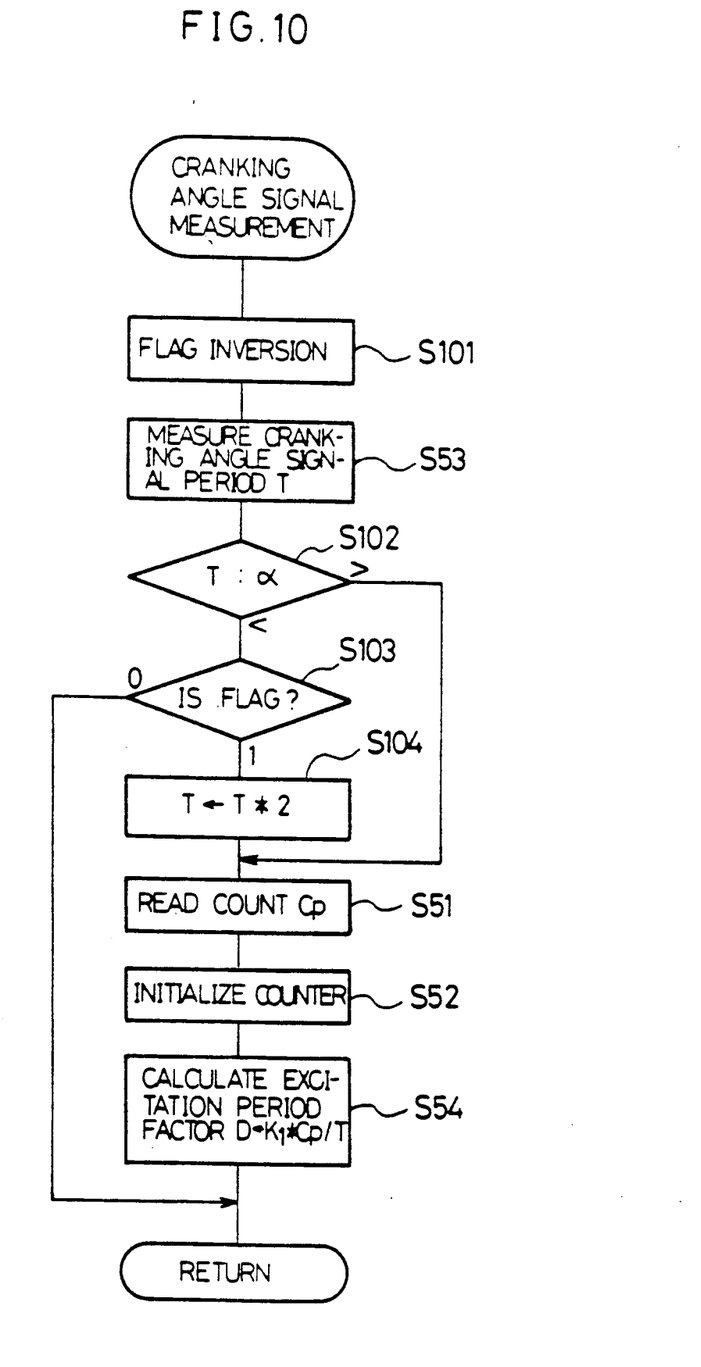
FIG. 10 is a flow chart illustrating an operation when a cranking period is an excitation period detection period of the apparatus according to the invention.

FIG. 10 shows an example of the cranking angle interruption routine for explaining the operation of second correction means 5L. In this example, count Cp and excitation period factor D are detected for every two cranking angle signal periods in a predetermined engine idling rate. In FIG. 10, steps S51 to S54 are the same as those in FIG. 5. First, step S101 of FIG. 10 is a flag inversion step. This flag is for detecting count Cp and excitation period factor D whenever a flag is detected in step S103. In step S53, cranking angle signal period T is measured in the same way as in FIG. 5. In step S102, the predetermined engine idling rate is detected from cranking angle signal period T measured in step S53. If period T is shorter than predetermined value α, that is, when the idling rate of the engine is high, step S103 is executed. When period T is longer than α, that is, when the engine idling rate is low, steps S103 and S104 are skipped to execute step S51. Step S103 is a check step for executing the reading of count Cp and excitation period calculation for every two periods with respect to the flag inverted in step S101. If the flag is "0", steps S104, S51, S52 and S54 are skipped to complete the interruption routine. If the flag is "1", step S104 is executed. In step S104 cranking angle signal period T measured in step S53 is doubled to obtain detected period T which is used in the excitation period calculation in step S54. Steps S51 and S54 are identical to those in FIG. 5. When the engine idling rate is low, the reading of count Cp and the calculation of excitation period factor D are executed for every cranking angle signal period. When the engine idling rate is high. these operations are executed for every two cranking angle signal periods.

In this embodiment, the switching is done only once depending on the engine idling rate, but it is possible to perform switching several times.

As has been shown in the foregoing, according to the invention the excitation period of the switching means for controlling the field current in the generator is detected with the excitation period detection means 5T, and the correction amount determined according to the excitation period is obtained with first correction means 5N. thereby correcting the idling rate of the engine. Thus, it is possible to detect the engine load variation due to the electric load increase accurately and early and also to prevent reduction of the engine idling rate and engine stall due to a control response delay. Further, construction is simple. Further, since the output phase of the generator is synchronized to the phase of the engine rotation, the correction amount is determined on the basis of the excitation period in each predetermined cranking period, and thus a highly accurate detected amount can be obtained stably. Further, since the second correction means changes the predetermined cranking period according to the idling rate of the engine. it is possible to obtain a highly accurate detected amount of the load variation with satisfactory response.

Figure 11:
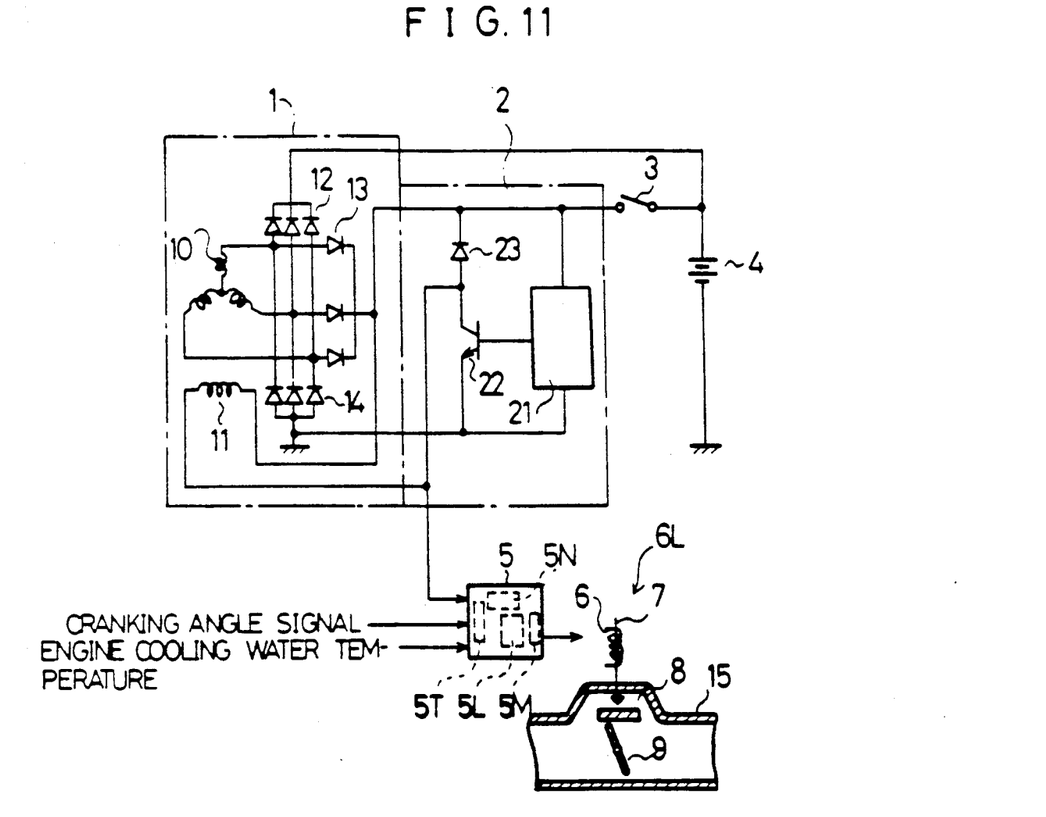
FIGS. 11 and 12 are schematics showing the overall construction and a control unit of a different embodiment of the apparatus according to the invention.

Now, a different embodiment of the invention will be described with reference to FIGS. 11 to 16. FIG. 11 shows the construction of this embodiment of the engine idling rate control apparatus. Designated at 1 is a generator. 2 is a switching means for controlling excitation current in field coil 11, 3 is a engine switch, and 4 is a battery mounted in a vehicle. Generator 11 consists of Y-connected diodes 12 to 14 for rectifying three-phase AC outputs of armature winding 10, field coil 11 and armature winding 10. Switching means 2 includes voltage detection circuit 21 for detecting the voltage of battery 4, semiconductor switching element 22 connected in series with field coil 11 and turned conductive by the output of voltage detection circuit 21 when the voltage of battery 4 becomes lower than a predetermined level and diode 23 for causing commutation of excitation current flowing through field coil 11 when semiconductor switching element 22 becomes non-conductive. Designated at 5 is a control unit, which receives an ON-OFF signal at a connection point between field coil 11 and semiconductor switching element 22 (hereinafter referred to as an "excitation signal"), a cranking angle signal generated in synchronism with a predetermined cranking angle of the engine, and an output of engine cooling water temperature sensor (not shown). Control unit 5 detects the excitation period of field coil 11 in a predetermined cranking period of the engine (i.e.. "ON" period of semiconductor switching element 22) and engine cooling water temperature and calculates the control amount according to the result of the detection. The control unit comprises excitation period detection means 5T and first and second correction means 5N and 5L. Designated at 6 is a solenoid for ON-OFF controlling electromagnetic valve 7 according to the control amount output of control unit 5. By-pass passage 8 of throttle valve 9 provided in an in-take air path 15 of engine is opened and closed with the opening and closing of electromagnetic valve 7. Designated at 5M is a third correction means for controlling the idling rate of the engine. Designated at 120 is a temperature detection means for detecting the temperature of the generator either directly or indirectly. In this embodiment, means 120 is constructed with a sensor for detecting the temperature of the engine cooling water temperature so as to indirectly detect the generator temperature.

Figure 12:
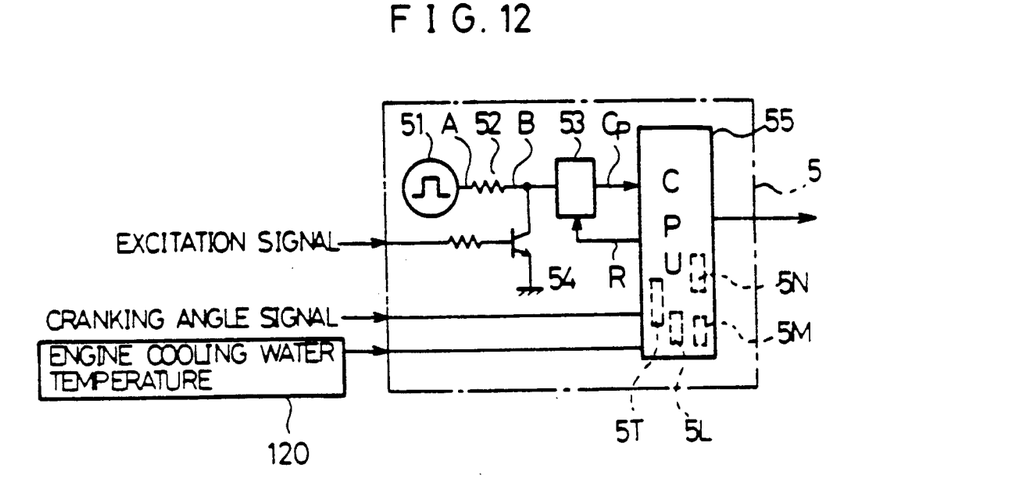

The operation of the above-described structure will now be described. Generator 1 is driven by the vehicle engine to charge battery 4. Switching means 2 controls excitation current through control of the excitation period of field coil 11 such that the voltage generated by generator 1 or voltage of battery 4 becomes a predetermined value. FIG. 12 shows details of control unit 5. Designated at 51 is a pulse generator for generating pulse signal A at a predetermined frequency (FIG. 3(c)). Pulse signal A is supplied though resistor 52 to counter 53. Meanwhile, the input signal is masked by transistor 54 for a non-conduction period of excitation signal shown in FIG. 3(b). and thus signal B shown in FIG. 3(d) is supplied to counter 53. Counter 53 counts signal B and supplies count data C in FIG. 3(e) to CPU 55. CPU 55 reads out count Cp whenever the cranking angle signal shown in FIG. 3(a) is generated (i.e., for every rising edge in this embodiment). and it initializes counter 53 by providing an initialization signal R (FIG. 3(f)). With the above operation, count Cp read out by CPU 55 corresponds to an excitation period for every predetermined cranking period.

Figure 13:
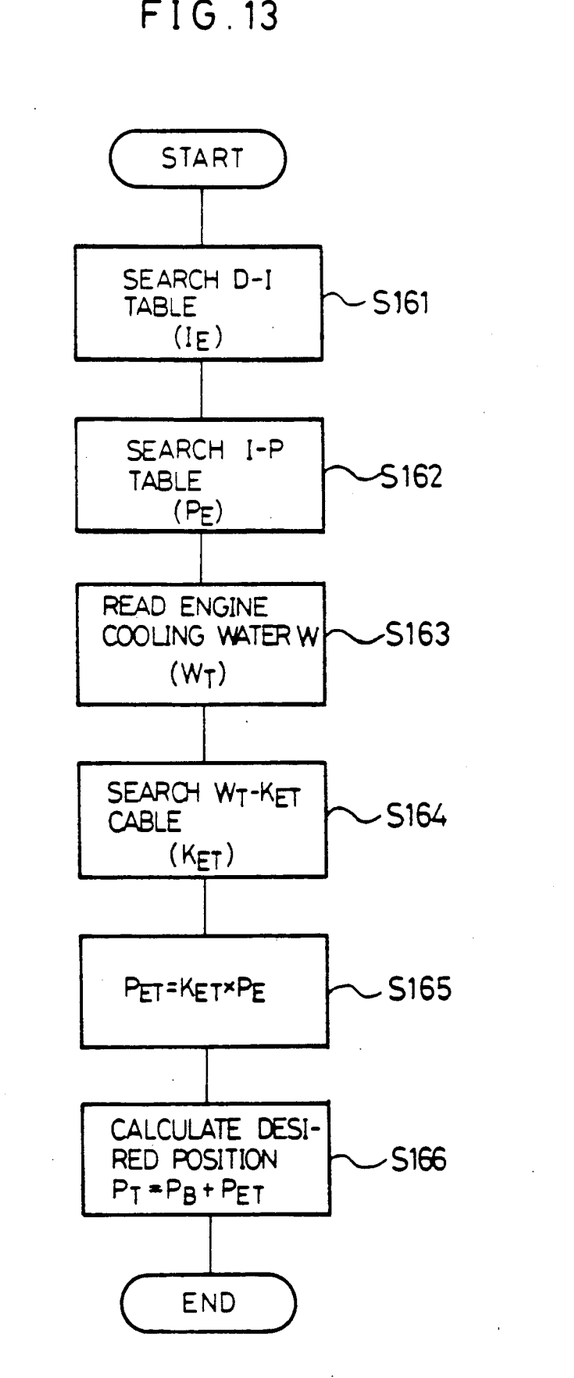
FIG. 13 is a flow chart showing the operation of the apparatus according to the invention.
Figure 14:
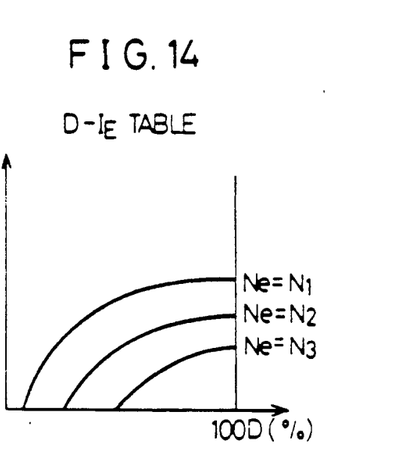
FIGS. 14 to 16 are graphs showing control characteristics stored in a control unit in the apparatus according to the invention.
Figure 15:
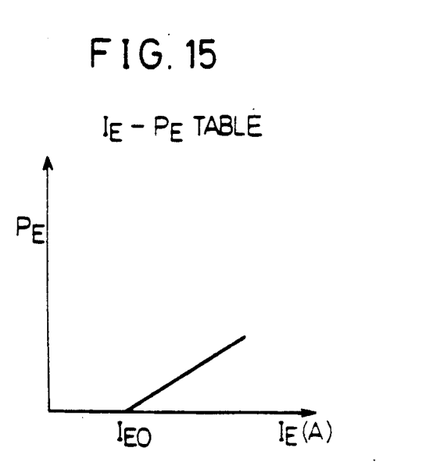
Figure 16:
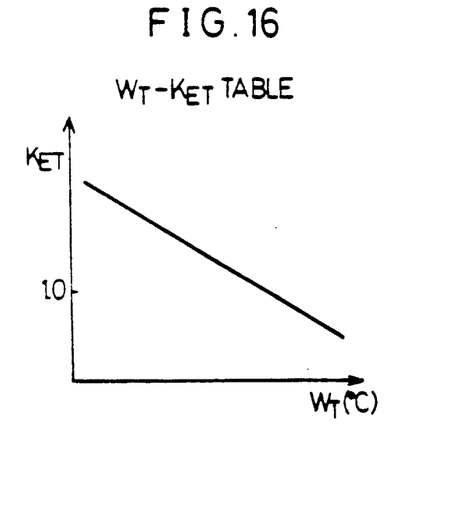

Further, CPU 55 reads out engine cooling water temperature data and calculates a control amount for controlling an in-take air supply rate form the engine cooling water temperature count Cp and cranking angle signal. Its operation will now be described. The routine shown in FIG. 13 is repeatedly executed according to a control program. When a cranking angle signal is generated during execution, the routine shown in FIG. 13 is stopped, and a cranking angle signal interruption routine is executed. In step S51 count Cp is read out, and in step S52 externally provided counter 53 is initialized. More particularly, count Cp read out by CPU 55 is updated for every crank angle signal. Then, in step S53 cranking angle signal period T is measured, and in step S54 excitation period factor D with respect to cranking angle signal period T is obtained from an equation $$D = K_1 \times Cp/T$$

where $K_1$ is a conversion factor for converting excitation period factor D into a predetermined resolution. That is, the excitation period factor D corresponds to the excitation current flowing though field coil 11. In the above way, the cranking angle signal interruption routine shown in FIG. 5 is completed.

Next, in a routine shown in FIG. 13. $I_E$ is searched from the relation between excitation period factor D and $I_E$ shown in FIG. 14. The value of $I_E$ corresponds to the output current of generator 1 in a sufficiently warmed-up state of the engine, i.e., sufficiently warmed-up state of generator 1. The relationship of D vs. $I_E$ is set by an idling rate N of the engine for D which corresponds to the excitation current in field coil 11 while $I_E$ corresponds to the output current of generator 1. In other words, the output of generator 1 is determined by the magnitude of the excitation current and idling rate of engine. In step S162, a standard correction amount $P_e$ in the sufficiently warmed-up state of generator 1 is searched according to generator output state $1_E$ from the relation between the generator output current $I_E$ and the correction amount P shown in FIG. 15. Data set in FIG. 15 sets the correction amount corresponding to the electric load increase with the point of generator output $I_{EO}$ in the absence of electric load as a zero correcting amount. In step S163, engine cooling water temperature data $W_T$ is read out, and in step S164 a correction coefficient $K_{ET}$ corresponding to engine cooling water temperature $W_T$ is searched from a table listing cooling water temperature $W_T$ and correction coefficient $K_{ET}$ shown in FIG. 16. In step S165, correction amount $P_E$ is multiplied by correction coefficient $K_{ET}$. Correction coefficient $K_{ET}$ is 1.0 for an engine cooling water temperature in a sufficiently warm-up state of the engine, i.e., in a sufficiently warmed-up state of generator 1. When the cooling water temperature, i.e., temperature of generator 1, is lower, correction coefficient $K_{ET}$ is increased to make up for the correction amount $P_E$.

On the other hand, when the engine cooling water temperature, i.e., temperature of generator 1, is higher than the warmed-up state, correction coefficient $K_{ET}$ is reduced to prevent correction amount $P_E$ from becoming excessive. Thus, the product PET of the correction amount $P_E$ and correction coefficient $K_{ET}$ is set to a control amount corresponding to the electric load at all times irrespective of the temperature of generator 1. In step S166, the basic in-take air supply rate control amount $P_B$ is added to $P_{ET}$ to obtain a final control amount $P_T$. In this way, the in-take air supply rate is increased according to $P_{ET}$.

In the above embodiment, the correction coefficient $K_{ET}$ is searched according to the cooling water temperature, but the same effects can be obtained by searching the correction amount $K_{ET}$ through indirect detection of the generator temperature. Further, while correction amount $P_{ET}$ is multiplied by the correction coefficient $K_{ET}$, the same effects can be obtained by obtaining $P_{ET}$ by multiplying the excitation period of excitation period factor D by the correction coefficient $K_{ET}$.

Generally, the excitation period is varied according to the generator temperature, and with a fixed electric load the excitation period is increased with an increasing generator temperature. Thus, the control amount determined by the excitation period exceeds the required control amount to increase the idling rate of the engine. Likewise, for a fixed electric load the excitation period is reduced with reducing generator temperature so as to reduce the control amount determined according to the excitation period to be lower than the required control amount, thus reducing the idling rate of the engine.

In this embodiment, the control amount for controlling the idling rate of the engine is determined according to the excitation period of the generator, and the control amount is corrected according to the generator temperature. Thus, the excitation period varying according to the generator temperature can be precisely corrected, thus permitting accurate determination of the control amount and accurate control of the idling rate of the engine.

What is claimed is:

1. An apparatus for controlling an idling rate of an engine comprising:
    a generator driven by the engine for charging a battery,
    switching means for controlling an excitation current by controlling an excitation period of a field coil of the generator such that one of a voltage generated by said generator and said battery voltage becomes a predetermined voltage,
    engine idling rate control means for controlling the engine idling rate by a control amount,
    excitation period detection means for detecting the excitation period in each cranking period of a predetermined crank angle of each cylinder of said engine,
    first correction means for correcting the control amount for controlling the engine idling rate according to the output of said excitation period detection means, and
    second correction means for varying said cranking period according to the engine idling rate, wherein an output phase of said generator is synchronized with a phase of said rotation of said engine.

2. The apparatus according to claim 1, said apparatus further comprising a throttle valve provided in an intake path of said engine, and wherein the engine idling rate is controlled by opening and closing a bypass passage of said throttle valve.

3. The apparatus according to claim 1, wherein said generator comprises Y-connected armature windings and diodes for rectifying three-phase AC outputs of said armature windings.

4. The apparatus according to claim 1, wherein said switching means includes a voltage detection circuit for detecting the battery voltage, and a semiconductor switching element which is rendered conductive by the output of said voltage detection circuit when the battery voltage becomes lower than a predetermined level.

5. An apparatus for controlling the idling rate of an engine comprising:
    a generator driven by the engine for charging a battery,
    switching means for controlling an excitation current in a field coil of the generator by controlling an excitation period of the coil such that one of a voltage generated by said generator and a battery voltage becomes a predetermined voltage,
    engine idling rate control mean for controlling the engine idling rate by a control amount,
    excitation period detection means for detecting an excitation period in each cranking period of a predetermined crank angle of each cylinder of the engine,
    first correction means for correcting the engine idling rate according to the output of said excitation period detection means,
    second correction means for varying said cranking period according to the engine idling rate,
    temperature detection means for detecting the generator temperature one of directly and indirectly, and
    third correction means for correcting said engine idling rate according to the output of said temperature detection means.

* * * * *